United States Patent [19]

Knox et al.

[11] Patent Number: 4,477,230
[45] Date of Patent: Oct. 16, 1984

[54] CONTINUOUS PRESSURE AND TEMPERATURE READOUT FOR SUBMERSIBLE PUMPS

[75] Inventors: Dick L. Knox; Steven D. Roberts, both of Claremore, Okla.

[73] Assignee: Hughes Tool Company, Houston, Tex.

[21] Appl. No.: 430,622

[22] Filed: Sep. 30, 1982

[51] Int. Cl.³ ............................................. F04B 21/00
[52] U.S. Cl. ..................................................... 417/63
[58] Field of Search ............................. 417/63, 18–24, 417/13, 32; 340/856, 857, 870.16, 870.17

[56] References Cited

U.S. PATENT DOCUMENTS

| | | | |
|---|---|---|---|
| 3,340,500 | 9/1967 | Boyd et al. | 340/18 |
| 3,587,076 | 6/1968 | Grover | 340/182 |
| 4,142,148 | 2/1979 | Johansson | 340/856 X |
| 4,157,535 | 6/1979 | Balkanli | 340/18 |
| 4,178,579 | 12/1979 | McGibbeny et al. | 340/856 |

Primary Examiner—Edward K. Look
Attorney, Agent, or Firm—Robert A. Felsman; James E. Bradley

[57] ABSTRACT

A pressure and temperature measuring system for a submersible pump installation provides a continuous reading of both pressure and temperature at the surface and compensates for temperature changes in the pressure readout. The system includes a pair of downhole sensors, each of which provides an electrical resistance change corresponding to pressure or temperature. A switch at the surface alternately applies to the power cable a positive interim of positive DC current and a negative interim of negative DC current. Steering diodes located downhole direct the positive DC current through one of the sensors and the negative DC current through the other of the sensors. The voltage received at the surface corresponds to the resistance of the sensor through which current is passing. Sample and hold circuits sustain the pressure output during the interim of temperature measurement and vice-versa. During pressure measurement, a value corresponding to the temperature potential at the surface is applied as an offset which offsets the pressure potential. The output is a compensated pressure reading which is converted into a pressure indication.

6 Claims, 3 Drawing Figures

CONTINUOUS PRESSURE AND TEMPERATURE READOUT FOR SUBMERSIBLE PUMPS

BACKGROUND OF THE INVENTION

This invention relates in general to submersible pumps and in particular to a system for monitoring at the surface the pressure and temperature in the pump motor environment.

The submersible pump installations concerned herein include a large electric motor located in the well. The electric motor receives three-phase power over a power cable from the surface with voltages phase-to-phase being commonly 480 volts or more. The electric motor drives a centrifugal pump to pump well fluid to the surface.

It is important to be continuously aware at the surface of the downhole operating conditions. The pressure of the lubricant in the motor is the same as the well fluid pressure, and provides an indication of whether or not the pump is operating efficiently. Temperature also provides an indication of whether or not the motor is overheating, which might possibly cause early failure. U.S. Pat. No. 3,340,500, C. A. Boyd et al, Sept. 5, 1967 discloses a system for monitoring pressure using the power cables as a linkage between downhole sensors and uphole receiving units. The Boyd et al patent superimposes a DC level on the AC power conductors, with changes in the DC level being proportional to the physical characteristic sensed.

U.S. Pat. No. 3,587,076, James R. Grover, June 22, 1971, discloses means for measuring both temperature and pressure by using steering diodes downhole. The diodes direct positive current through one of the sensors and negative current through the other of the sensors to selectively provide a pressure reading or a temperature reading at the surface. While these two patents disclose successful systems, it is desirable to have a continuous reading of both pressure and temperature at the surface.

Also, some of the downhole pressure measuring components other than the sensors, change resistance with temperature. Unless compensated, this resistance change will cause erroneous readings. U.S. Pat. No. 4,178,579, James R. McGibbeny, Dec. 11, 1979, discloses means for subtracting from a temperature or pressure reading the resistance of the downhole equipment with the sensor disconnected. While this compensates for temperature, it requires a relay downhole which might be subject to failure.

SUMMARY OF THE INVENTION

In this invention, a pair of downhole sensing means are used, one providing a resistance change corresponding to pressure and the other providing a resistance change corresponding to temperature. Switch means at the surface alternately applies an interim of positive DC current and an interim of negative DC current. Steering diodes are located downhole for directing the positive current through only one of the sensors and the negative current through only the other of the sensors. The potential at the surface corresponds to the parameter being sensed.

A sustaining means is included in the surface equipment for sustaining the potential corresponding to temperature at the surface while the pressure is being measured and vice-versa. Also, during the pressure measurement, a value proportionate to the prior temperature potential measured is applied as an offset. This offset provides for temperature compensation.

DESCRIPTION OF THE PREFERRED EMBODIMENT

Figure 1:
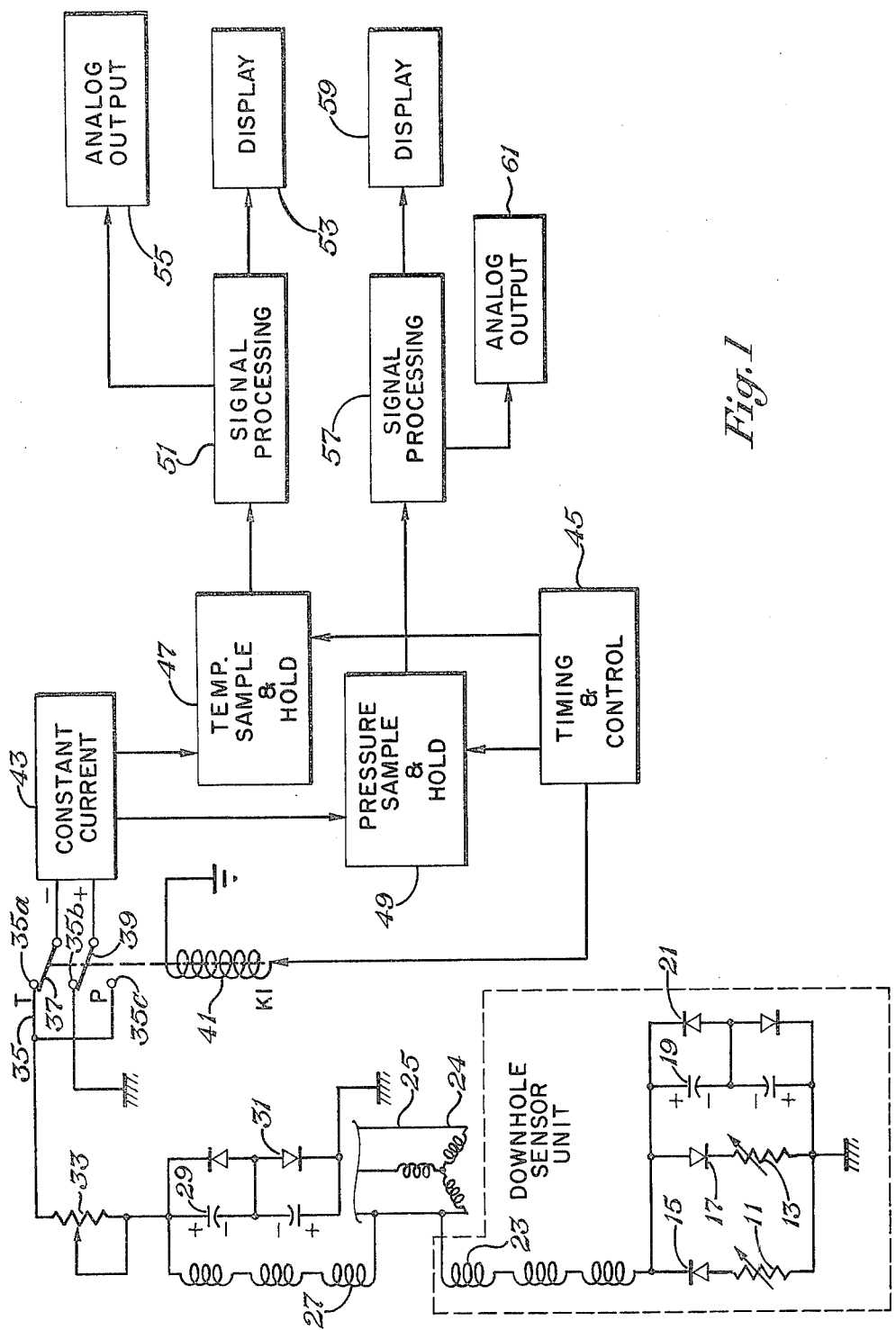
FIG. 1 is a schematic illustrating the overall system for measuring pressure and temperature of this invention.

Referring to FIG. 1, the system includes a downhole sensor unit which has a temperature sensor 11 and a pressure sensor 13. Sensors 11 and 13 are conventional and provide an electrical resistance change that corresponds to the temperature and pressure in their environment. Sensors 11 and 13 are normally located in the lubricating oil contained within the motor. Sensors 11 and 13 each have one leg connected to ground. The other leg of sensor 11 is connected to the anode of a diode 15. The other leg of sensor 13 is connected to the cathode of a diode 17.

For filtering alternating current, a pair of capacitors 19 in a series are connected between ground and the sides of the diodes 15 and 17 opposite the sensors 11 and 13. Two oppositely biased diodes 21 are connected across the two capacitors 19. The junction of the capacitors 19 is connected to the junction of the diodes 21. The capacitors 19 are connected to three inductors 23 in series. The inductors are connected to one of the three-phase windings in the motor 24. The three-phase AC current flowing from the surface through power cables 25 and through the motor 24 is blocked from the sensors 11 and 13 by the inductors 23 and capacitors 19. Positive DC current superimposed on the power cables 25 will flow through the pressure sensor 13 to ground, while negative DC current will flow from ground through temperature sensor 11.

At the surface, an uphole filter comprising inductors 27, capacitors 29 and diodes 31, arranged identically to inductors 23, capacitors 19 and diodes 21, is connected to one of the power cables 25. This filter blocks the AC current passing to motor 24 from the uphole measuring equipment. A potentiometer 33, is connected between inductors 27 and a switch 35.

Switch 35 has three poles, with pole 35a being connected to potentiometer 33. Pole 35b is connected to ground. Pole 35c is also connected to potentiometer 33. The poles of switch 35 are engaged by two wipers 37 and 39 which move in unison. Wiper 37 alternates from engagement with pole 35a and pole 35b. Wiper 39 alternates from pole 35b to pole 35c. Wipers 37 and 39 are shifted by a K-1 relay 41. In the position shown in FIG. 1, a conventional constant current source 43 applies negative current to pole 35a, which causes a current flow through temperature sensor 11. In the other position, not shown, constant current source 43 applies positive current of constant value through pole 35c to flow through diode 17 and pressure sensor 13 to ground.

A timing and control circuit 45 alternately applies voltage to relay 41 for an interim of negative current and an interim of positive current. The uphole voltage measured at switch 35 during the negative interim corresponds to the resistance of temperature sensor 11. This voltage is applied to a temperature sample and hold circuit 47. The timing and control circuit 45 provides a gate pulse to the temperature sample and hold circuit 47, which allows the potential received to pass through the sample and hold circuit for a brief moment during the interim that the negative current is applied. The new value at the output of the sample and hold circuit 47 is then held until another gate pulse is applied to the sample and hold circuit 47. The signal processing circuit 51 converts the output to a digital value for display 53. The analog value is available at analog output 55.

A pressure sample and hold circuit 49 also receives the potential at the surface when negative current is applied. It will not, however, receive a gate pulse to pass this value until a selected point during the interim in which positive current is applied by the constant current source 43. Similarly, when the timing and control circuit 45 applies a gate pulse to the pressure sample and hold circuit 49, an output is provided to a signal processing circuit 57. Signal processing circuit 57 converts the analog value into a digital value which is displayed at display 59. The analog value is available at analog output 61.

Figure 3:
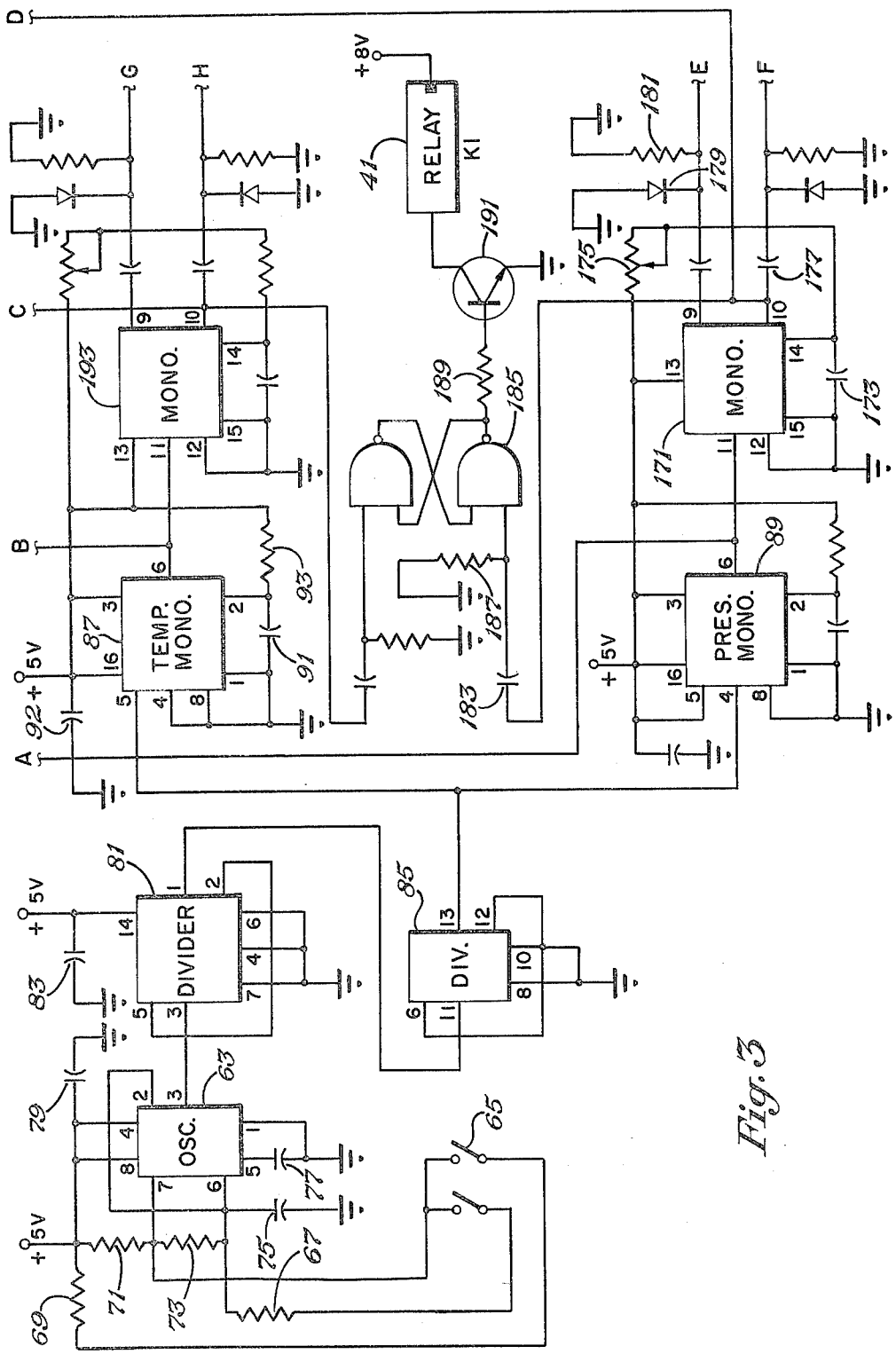
FIG. 3 is a schematic illustrating another portion of the system of FIG. 1.

Referring now to FIG. 3, the timing and control portion and the switch means portion of the system include an oscillator 63. Oscillator 63 is a conventional clock, LM555, connected in a conventional manner as shown to provide pulses on pin 3 of a relatively slow frequency. A switch 65 increases the frequency of oscillator 63 for calibration purposes. Switch 65 is a two-pole switch, having one wiper connected through a resistor 67 to pin 6 of oscillator 63. The other wiper is connected through resistor 69 to pins 4 and 8. A 5 volt source supplies voltage through a resistor 71 to pin 7. Pin 7 is connected to pin 6 through a resistor 73. A capacitor 75 is connected between ground and pin 6. A capacitor 77 is connected between ground and pin 5. Pin 1 is grounded. Pin 2 is connected to pin 6. Pins 4 and 8 are connected to a capacitor 79, which is grounded.

A first half of a dual flip-flop, comprising divider 81 receives the output from oscillator 63. Divider 81 divides the pulses by two. Divider 81 is part of a conventional circuit F4013DBM, connected in a conventional manner as shown. The connections include a resistor 83 having one side connected to pin 14 and a 5 volt source, and the other side connected to ground. The second half of the dual flip-flop is divider 85, it also being connected in a similar manner to divide by two. The output on pin 13 of divider 85 is a symmetrical square wave that has a rise or increase followed by a decrease considerably later, 4 minutes in the preferred embodiment.

Two monostable multivibrators 87 and 89 are connected to the output of divider 85. Multivibrator 89 is connected to provide a gate pulse of about 100 millisecond duration upon receipt of a rise or increase in value from the divider 85. Consequently, in the preferred embodiment, a gate pulse will be provided on pin 6 of multivibrator 89 every 8 minutes. Conversely, multivibrator 87 is connected to provide a 100 millisecond gate pulse upon receipt of a drop in value from divider 85. The gate pulse on pin 6 of multivibrator 87 will also be produced once every 8 minutes. Both multivibrators are part of a conventional circuit F4538DBM connected in a conventional manner as shown. The connections include for each a capacitor 91 connected between pins 1 and 2. A capacitor 92 is connected between ground and pin 16, which is also connected to a 5 volt source. A resistor 93 is connected between pins 2 and 3.

Figure 2:
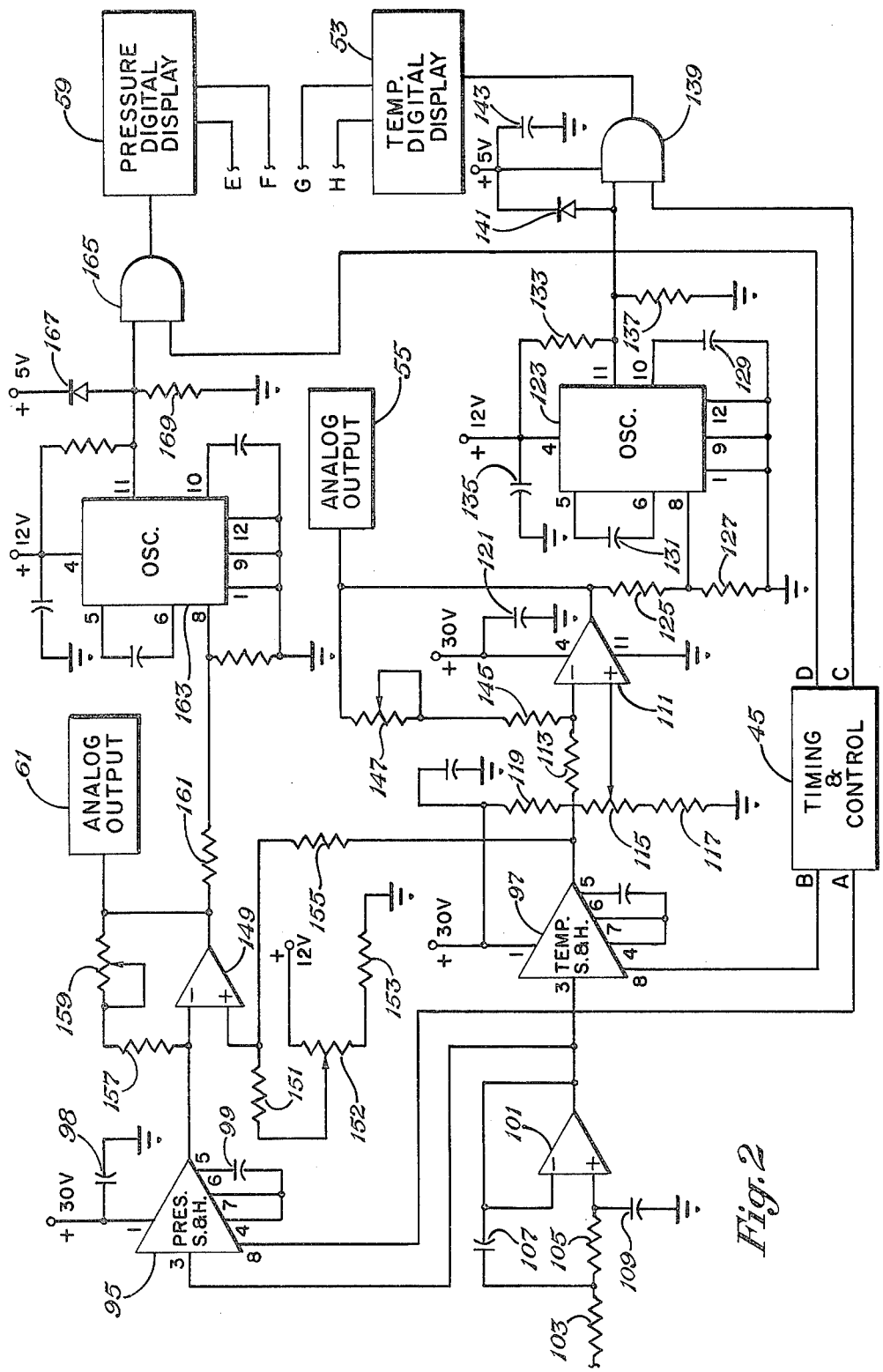
FIG. 2 is an electrical schematic showing a portion of the system of FIG. 1.

Referring now to FIG. 2, the gate pulses of the multivibrators 87 and 89 are produced on the lines A and B of the timing and control circuit 45. A gate pulse on line A is provided to a pin 8 of a pressure sample and hold circuit 95. The gate pulse on line B is provided to pin 8 of a temperature sample and hold circuit 97. Both sample and hold circuits 95 and 97 are conventional items, LM198, and connected in a normal manner as shown. These connections include for each a capacitor 98 connected between ground and pin 1, which is also connected to a 30 volt source. A capacitor 99 is connected between pins 4 and 5. Receipt of a gate pulse on pin 8 of either sample and hold circuit 95 or 97 allows the sample and hold circuit to pass whatever value it has on its input pin 3 to its output pin 5. The value on output pin 5 will be held until the next gate pulse is received. Both input pins 3 are connected to the output of an amplifier 101, which is part of a low pass filter.

Amplifier 101 has its positive input connected through resistors 103 and 105 to the constant current source 43 (FIG. 1) so as to receive a voltage that corresponds to current flowing through either the temperature sensor 11 or the pressure sensor 13 (FIG. 1). The low pass filter includes a capacitor 107 connected between the junction of resistors 103 and 105 and the negative input of amplifier 101. The negative input of amplifier 101 is also connected to the output of amplifier 101. A capacitor 109 is connected between the positive input of amplifier 101 and ground. The input pins 3 of both sample and hold circuits 95 and 97 continuously receive a voltage that corresponds to current flowing through either temperature sensor 11 during a negative current interim or pressure sensor 13 during a positive current interim. The gate pulses provided at pins 8 of the sample and hold circuits 95 and 97, however, prevent these input values from being produced as an output unless at the proper sequence. The multivibrators 87 and 89 (FIG. 3) are timed so that a gate pulse is provided to pressure sample and hold circuit 95 only immediately before the conclusion of a positive current interim. A gate pulse is provided to the temperature sample and hold circuit 97 only just before the conclusion of a negative current interim.

Referring still to FIG. 2, the output of the temperature sample and hold circuit 97 is connected to the negative input of an amplifier 111 through resistor 113. Amplifier 111 has its positiva input connected to a potentiometer 115, which in turn is connected to ground through a resistor 117. The other side of resistor 115 is connected through a resistor 119 to a 30 volt source. Amplifier 111 is an LM124 amplifier, and has its pin 4 connected to a 30 volt source and to ground through a capacitor 121. Pin 11 of amplifier 111 is grounded. The amplified output of amplifier 111 is applied to the input pin 8 of a voltage controlled oscillator 123. Oscillator 123 provides variable frequency pulses dependent upon the DC voltage applied to its pin 8. Oscillator 123 is an XR2206CP oscillator. Its associated circuitry includes a resistor 127 connected from pin 8 to ground. A capacitor 129 connects pin 10 with pins 1, 9 and 12. A capacitor 131 connects pin 5 and 6. A resistor 133 connects pin 11 with a 12 volt source and pin 4. A capacitor 135 is connected between pin 4 and ground. Pin 11 is connected through resistor 137 to ground.

The pulses produced on output pin 11 by oscillator 123 are applied to a NAND gate 139. NAND gate 139 will continuously receive pulses from oscillator 123 because a DC value will always be present at the output of the sample and hold circuit 97. This DC value will represent the temperature that was previously measured during the 100 millisecond interval when the gate pulse from the multivibrator 89 (FIG. 3) was applied to the sample and hold circuit 97. NAND gate 139, however, will not allow the pulses to proceed until it receives a gate pulse on line C. Once it receives this gate pulse, as will be explained subsequently, it will allow the pulses to pass to a digital counter that is part of digital display 53. The digital counter will count the pulses that it receives during the 100 millisecond gate pulse interval and display this amount as an indication of temperature. The counter will reset once it receives the same gate pulse and latch when the gate pulse terminates, through lines G and H. The counter will latch and display the same value for 8 minutes until another temperature sample is taken.

The NAND gate 139 includes among its associated circuitry a diode 141 connected between its input and a 5 volt source. A capacitor 143 is connected between the DC input of NAND gate 139 and ground. An analog output 55 is also available corresponding to the temperature and for use such as controlling the motor speed in proportion to the temperature; that is, if the temperature increases beyond a certain level, the motor speed could be slowed. This analog output is taken directly from the negative input of amplifier 111. A resistor 145 and a potentiometer 147 extend to analog output 55.

The processing of the pressure value located at output pin 5 of pressure sample and hold circuit 95 is similar to the temperature processing. This continuous value at pin 5 represents the potential corresponding to the pressure reading taken during the 100 millisecond interval just before the conclusion of the positive current interim. This value is applied to an amplifier 149, whose output signal is offset proportionate to the temperature reading to provide for temperature compensation. The inductors 23 (FIG. 1) downhole change in resistance as the temperature changes. This change is a known value for the inductors 23, thus can be compensated if the temperature is known. This compensation is handled by taking the continuous temperature output from pin 5 of temperature sample and hold circuit 97 and applying a portion of that signal to the positive input of amplifier 149. The positive input of amplifier 149 is connected through a resistor 151 to the wiper of a potentiometer 152. Potentiometer 152 is connected to a 12 volt supply and through a resistor 153 to ground. The positive input of amplifier 149 is also connected through a resistor 155 to the output of temperature sample and hold 97. Amplifier 149 is offset by the temperature value and provides a compensated output.

An analog output 61 is available at this point, through the connection with the output of comparator 149. The analog output 61 is connected to the negative input of comparator 149 by means of a resistor 157 and potentiometer 159. For the digital readout of pressure, the output from comparator 149 is applied through a resistor 161 to an oscillator 163 that is connected in the same manner as oscillator 123 and is of the same type. Oscillator 163 applies pulses of variable frequency depending upon the voltage input to its pin 8. These pulses are applied to a NAND gate 165, identical to NAND gate 139. NAND gate 165 receives the continuous pulses, but allows the pulses to pass only during a 100 millisecond interval when it receives a gate pulse on line D. Upon receipt, these pulses proceed to a digital counter in the digital display 59, where they are counted and displayed directly as an indication of pressure. The counter is reset and latched through lines E and F. NAND gate 165 is connected to a 5 volt source through a diode 167 and a resistor 169, which leads to ground.

Referring now to FIG. 3, the means for switching the relay 41 (FIG. 1), and for controlling the NAND gates 139 and 165 will be described. The pressure monostable multivibrator 89 provides a 100 millisecond gate pulse on pin 6 to a second monostable multivibrator 171. Multivibrator 171 is part of the same dual one shot arrangement that includes multivibrator 89. Multivibrator 171 is connected so that it will produce a gate pulse on pin 10 at the conclusion of the gate pulse that it receives on pin 11. Multivibrator 171 includes among its circuitry a capacitor 173 connected between pins 14 and 15 and to ground. A potentiometer 175 is connected between pin 14 and pin 13. Its output on pin 10 is a gate pulse of 100 millisecond duration that passes through a capacitor 177 to line F to reset the counter in the pressure display 59. A latch pulse at the conclusion of the count proceeds through pin 9 through a similar capacitor on line E to the counter of the pressure display 59. Both lines E and F are connected to ground through identical diodes 179 and resistors 181.

The gate pulse output on pin 10 of the multivibrator 177 also proceeds through a capacitor 183 to an input of a flip-flop 185, which has the same input grounded through a resistor 187. Flip-flop 185 is connected in the preferred embodiment so that it will provide a high output through resistor 189 to a transistor 191 upon receipt of a gate pulse from multivibrator 171. This causes transistor 191 to conduct, causing relay 41 to shift switch 35 (FIG. 1) from the positive current to a negative current mode. The negative current will last for 4 minutes, at which time a temperature measurement will be made prior to the conclusion of the negative current interim.

Similarly, a second multivibrator 193, connected similar to multivibrator 171, provides a 100 millisecond gate pulse at the conclusion of the gate pulse provided by the temperature multivibrator 87. This gate pulse is applied to a second input of flip-flop 185. Receipt of one of these gate pulses turns off transistor 191, causing the relay to flip back to a positive current interim for the following 4 minutes.

In the overall operation of the system, for measuring temperature, as shown in FIG. 1, negative constant current is applied through the constant current circuit 43, superimposed on the AC power cables 25, and passed through the temperature sensor 11 from ground. During the negative interim, as shown in FIG. 2, a positive potential will be present at low pass filter 101, filtered and applied to both the inputs of the sample and hold circuits 95 and 97. This potential, however, will not pass through the sample and hold circuits 95 and 97 unless a gate pulse is delivered by one of the multivibrators 87 and 89, as shown in FIG. 3. These multivibrators are controlled by oscillator 63 and its dual flip-flops 81 and 85 so that the temperature multivibrator 87 will provide a 100 millisecond gate pulse just before the conclusion of the 4 minutes of the negative current interim. The pressure multivibrator 89 will not provide a gate pulse during the negative current interim. The gate pulse is applied only to the temperature sample and hold circuit 97, which then allows the input value to proceed to its output, where it will continuously hold it until another gate pulse is received 8 minutes later.

The output from the temperature sample and hold circuit 97 is amplified and converted by a voltage controlled oscillator 123 into pulses, the frequency of which is proportional to that DC value corresponding to the resistance through the temperature sensor 11. Referring again to FIG. 3, at the conclusion of the 100 millisecond gate pulse, the temperature multivibrator 87 actuates a second multivibrator 193, which provides another 100 millisecond gate pulse. The latter gate pulse is applied to the NAND gate 139, as shown in FIG. 2, which then allows the pulses from oscillator 123 to pass to a digital counter. The counter counts these pulses during the latter gate pulse interim, and displays the value until another gata pulse is received at NAND gate 139. The gate pulse from the second multivibrator 193, shown in FIG. 3, is also applied to a flip-flop 185, which actuates the relay 41 to shift to the positive current interim.

Positive current will then be applied for 4 minutes to flow through the pressure sensor 13 (FIG. 1). The positive voltage corresponding to the resistance of the pressure sensor 13 will be present at both sample and hold circuits 95 and 97 (FIG. 2). At the conclusion of the 4 minute positive interim, the oscillator 63 will signal the pressure monostable multivibrator 89 to provide a 100 millisecond gate pulse to the pressure sample and hold circuit 95. The output value then is applied to amplifier 149. This value is compensated for temperature by offsetting the preceding output of the temperature sample and hold circuit 97. The difference controls an oscillator 163, which provides pulses to a NAND gate 165. Upon receipt of a gate pulse from the second multivibrator 193, the NAND gate 165 will allow the pulses from the oscillator 163 to proceed to a counter in the display 59, where an indication of pressure will then be displayed.

In the preferred embodiment, the switch means for alternately applying to the cables a positive interim of DC potential and a negative interim of DC potential comprises switch 35, relay 41 and part of the timing and control circuitry 45. The directional means located downhole for directing the positive DC potential to only one of the sensors and the negative DC potential to only the other of the sensors comprises diodes 15 and 17. The sustaining means at the surface for sustaining during the positive interim a response received during the negative interim and vice-versa comprises the sample and hold circuits 95 and 97, the oscillator 63 and the multivibrators 87 and 89.

The conversion means for converting the temperature and pressure potentials occurring at the surface into indications when current is passing through the respective sensors comprises amplifiers 111 and 149, oscillators 123 and 163, NAND gates 139 and 165, and the digital counters in the displays 53 and 59. The temperature compensation means comprises the amplifier 149, potentiometer 152 and resistors 151, 153 and 155. The pulse means for providing gate pulses alternately to each of the sample and hold means and in sequence with the switching means, comprises for the temperature the multivibrators 87 and 193 and for pressure, multivibrators 89 and 171.

The invention has significant advantages. By sampling a reading of pressure and temperature only after a considerably long interval, downhole filtering capacitors are allowed to fully charge, and spurious readings are reduced. A continuous value representing pressure and temperature at a fairly recent time period is present both in analog and digital form at the surface. Temperature compensation is made by offsetting a pressure value with the temperature value at the surface.

While the invention has been shown in only one of its forms, it should be apparent to those skilled in the art that it is not so limited but is susceptible to various changes and modifications without departing from the scope of the invention.

We claim:

1. In a submersible pump system having power cables extending from an AC power source at the surface to a downhole motor, an improved means for measuring pressure and temperature in the environment of the motor, comprising in combination:
   a pressure sensing means in the environment of the motor for providing a voltage change proportional to a change in pressure;
   a temperature sensing means in the environment of the motor for providing a voltage change proportional to a change in temperature;
   switch means at the surface for alternately applying to the cables a poaitive interim of positive DC potential and a negative interim of negative DC potential;
   directional means for directing the positive DC potential to only one of the sensing means and for directing the negative DC potential to only the other of the sensing means;
   sustaining means at the surface for sustaining during the positive interim a response received during the negative interim, and sustaining during the negative interim a response received during the positive interim; and
   temperature compensation means for offsetting a response received when current passes through the pressure sensing means with a value corresponding to a response received when current passed through the temperature sensing means, to provide a compensated pressure indication.

2. In a submersible pump system having power cables extending from an AC power source at the surface to a downhole motor, an improved means for measuring pressure and temperature in the environment of the motor, comprising in combination:
   a pressure sensing means in the environment of the motor for providing a change in resistance corresponding to a change in pressure;
   a temperature sensing means in the environment of the motor for providing a change in resistance corresponding to a change in temperature;
   switch means at the surface for alternately applying to the cables a positive interim of positive DC current and a negative interim of negative DC current;
   directional means located between the cables and the sensing means for directing the positive DC current through only one of the sensing means and the negative DC current through only the other of the sensing means;
   temperature conversion means at the surface for converting into a temperature indication a temperature potential occurring at the surface when current is passing through the temperature sensing means;
   pressure conversion means at the surface for converting into a pressure indication a pressure potential occurring at the surface when current is passing through the pressure sensing means; and temperature compensation means for applying a value corresponding to the temperature potential occurring during a preceding interim to the pressure conversion means to compensate the pressure indication in relation to the temperature.

3. In a submersible pump system having power cables extending from an AC power source at the surface to a downhole motor, an improved means for measuring pressure and temperature in the environment of the motor, comprising in combination:

a pressure sensing means in the environment of the motor for providing a change in resistance corresponding to a change in pressure;

a temperature sensing means in the environment of the motor for providing a change in resistance corresponding to a change in temperature;

switch means at the surface for alternately applying to the cable a positive interim of positive DC current and a negative interim of negative DC current, directional means located between the cables and the sensing means for directing the positive DC current through only one of the sensing means and the negative DC current through only the other of the sensing means;

temperature conversion means at the surface for converting into a temperature indication a temperature potential occurring at the surface when current is passing through the temperature sensing means;

pressure conversion means at the surface for converting into a pressure indication a pressure potential occurring at the surface when current is passing through the pressure sensing means;

temperature compensation means for comparing a value corresponding to the temperature potential occurring during a preceding interim to the pressure to compensate the pressure indication in relation to the temperature; and sustaining means at the surface for sustaining during one interim the potential observed during the preceding interim, to provide continuous pressure and temperature indications.

4. In a submersible pump system having power cables extending from an AC power source at the surface to a downhole motor, an improved means for measuring pressure and temperature in the environment of the motor, comprising in combination:

a pressure sensing means in the environment of the motor for providing a change in resistance corresponding to a change in temperature;

a temperature sensing means in the environment of the motor for providing a change in resistance corresponding to a change in temperature;

switch means at the surface for alternately applying to the cables a positive interim of positive DC current and a negative interim of negative DC current;

directional means located between the cables and the sensing means for directing the positive DC current through only one of the sensing means and the negative DC current through only of the other of the sensing means;

two sample and hold means, each for receiving a potential at the surface corresponding to current passing through one of the sensing means, each for providing upon receipt of a gate pulse an output corresponding to the received potential, and for holding the output until receipt of a next gate pulse;

pulse means for providing the gate pulses alternately to each of the sample and hold means and in sequence with the switch means so that the output of one of the sample and hold means corresponds to current that passed through the pressure sensing means, and the output of the other sample and hold means corresponds to current passing through the temperature sensing means; and conversion means for converting the outputs of the sample and hold means into pressure and temperature indications.

5. In a submersible pump system having power cables extending from an AC power source at the surface to a downhole motor, an improved means for measuring pressure and temperature in the environment of the motor, comprising in combination:

a pressure sensing means in the environment of the motor for providing a change in resistance corresponding to a change in temperature;

a temperature sensing means in the environment of the motor for providing a change in resistance corresponding to a change in temperature;

switch means at the surface for alternately applying to the cables a positive interim of positive DC current and a negative interim of negative DC current;

directional means located between the cables and the sensing maans for directing the positive DC current through only one of the sensing means and the negative DC current through only the other of the sensing means;

a pressure sample and hold means each for receiving a potential at the surface corresponding to current passing through both of the pressure sensing means and for providing on receipt of a gate pulse a pressure potential corresponding to current passing only through the pressure sensing means, and for holding the pressure potential until receipt of a next gate pulse;

a temperature sample and hold means for receiving a potential at the surface corresponding to current passing through the temperature sensing means and for providing upon receipt of a gate pulse a temperature output corresponding to current passing only through the temperature sensing means, and for holding the temperature output until receipt of a next gate pulse;

pulse means for providing the gate pulses alternately to each of the sample and hold means and in sequence with the switching means;

offset means for offsetting the pressure potential of the pressure sample and hold means with a value corresponding to the temperature output and for providing a temperature compensated pressure output; and conversion means for converting the temperature output and temperated compensated pressure output into temperature and pressure indications.

6. In a submersible pump system having power cables extending from an AC power source at the surface to a downhole motor, an improved means for measuring fluid pressure and temperature in the environment of the motor, comprising in combination:

a pressure sensing means in the environment of the motor for providing a voltage change proportional to a change in pressure;

a temperature sensing means in the environment of the motor for providing a voltage change proportional to a change in temperature;

switch means at the surface for alternately applying to the cables a positive interim of positive DC potential and a negative interim of negative DC potential;

directional means located downhole for directing the positive DC potential to only one of the sensing means and for directing the negative DC potential to only the other of the sensing means;

a pair of separate sustaining means at the surface, one for sustaining during the positive interim a response received during the negative interim and for providing a continuous indication proportional to one of the temperature and pressure, and the other for sustaining during the negative interim a response received during the positive interim and for providing a continuous indication proportional to the other of the temperature and pressure.

* * * * *

UNITED STATES PATENT OFFICE
CERTIFICATE OF CORRECTION

Patent No. 4,477,230          Dated October 16, 1984

Inventor(s)    DICK L. KNOX and STEVEN D. ROBERTS

It is certified that error appears in the above-identified patent and that said Letters Patent are hereby corrected as shown below:

At column 8, line 24, change "poaitive" to read "positive".

At column 9, line 63, delete the word "of" after the word "only".

At column 10, line 30, delete the word "maans" and insert the word "means".

At column 10, line 34, delete "each".

Signed and Sealed this

Sixth Day of August 1985

[SEAL]

*Attest:*

DONALD J. QUIGG

*Attesting Officer*      *Acting Commissioner of Patents and Trademarks*